Oct. 28, 1930. A. O. HOEFTMANN Re. 17,850

ARMORED CABLE

Original Filed Jan. 31, 1924

Inventor:
ALEXANDER O. HOEFTMANN,
by: Usma + Rauber
his Attorneys

Reissued Oct. 28, 1930

Re. 17,850

UNITED STATES PATENT OFFICE

ALEXANDER O. HOEFTMANN, OF WORCESTER, MASSACHUSETTS, ASSIGNOR TO THE AMERICAN STEEL AND WIRE COMPANY OF NEW JERSEY, A CORPORATION OF NEW JERSEY

ARMORED CABLE

Original No. 1,636,606, dated July 19, 1927, Serial No. 689,695, filed January 31, 1924. Application for reissue filed June 21, 1929. Serial No. 372,701.

This invention relates to the construction of electric cables and more particularly to the construction of cables requiring a protecting armor, such as underground, aerial and submarine cables.

One object of the present invention is to provide a cable of this class with a plurality of layers of sheet metal armor separated from each other by a cushion or layer of jute or the like to relieve a blow or compression of the inner armor when such blow or compression is exerted on the outer armor.

Another object of my present invention is the construction of cables of the above types having a metallic non-magnetic armor constructed and arranged to permit the use of an exploring coil in localizing breaks or faults, as they are commonly termed, in cables.

Another object of the invention is the provision of an armored cable having the novel construction, arrangement and combination of parts and materials illustrated and described and specifically pointed out in the appended claims.

Referring now to the drawing forming part of this specification, in which my invention is shown sufficiently to enable those skilled in the art to understand the construction and operation thereof, Figure 1 is a plan illustrating an armored electric cable embodying my invention.

Figure 1:
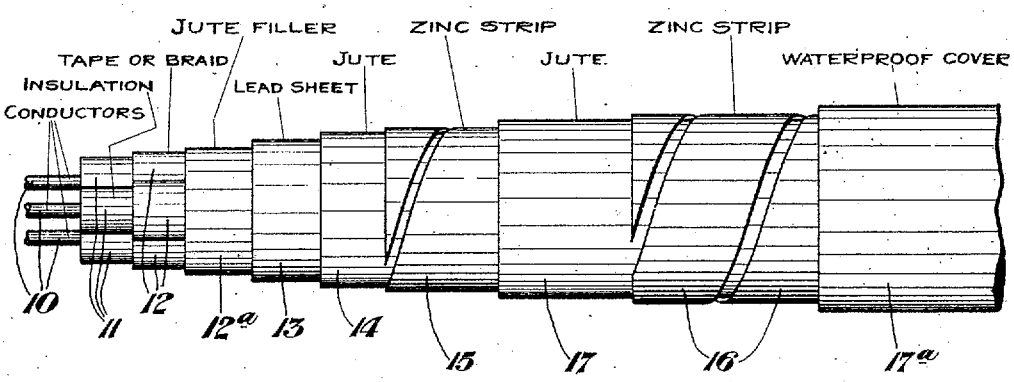
Figure 2:
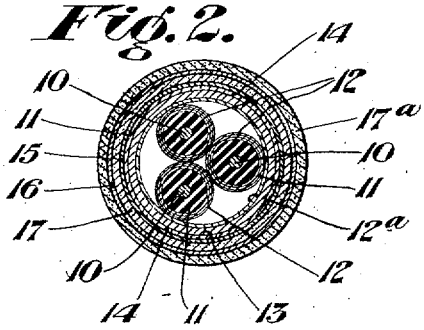
Figure 2 is an end elevation of the cable shown in Figure 1.

In the accompanying drawings, the numeral 10 designates the conductors of my improved cable. These conductors 10 may be made of strands instead of single wires, as shown, and the cables may have but a single conductor in lieu of the plurality of conductors shown. The conductors 10 are covered with a layer of insulatory material 11 which, in turn, is covered with tape or braid 12, and the insulated and taped or braided conductors 10 are surrounded with a jute filler 12[a] and enclosed within a lead sheath 13. Obviously, the sheath 13 may contain one or any desired number of conductors 10. The sheath 13 is then provided with a covering 14 formed of jute or similar fibrous non-conducting material.

Surrounding the jute covering 14 is a sheet metal non-magnetic armor, this armor preferably being formed of two layers of helically wound strips of zinc 15 and 16, the outer layer 16 being staggered with respect to the inner layer 15, so as to overlap the helical joint formed by the abutting edges of the strip 15, and being separated from the inner layer by a cushion 17 of jute or the like which is laid up between the layers of armor. The cushion 17 serves to relieve a blow or compression on the inner layer when such blow or compression is exerted on the outer layer. The outer layer of armor 16 is enclosed within an external covering 17[a] made of any suitable material and made water-proof or fire-proof, or both, in any desired known manner. It will be understood that if the non-magnetic feature is not desired the armor may be composed of steel or any other suitable metal.

With cables made in this manner any breaks or faults in a cable may be easily and quickly localized by the use of a suitable detector, without the necessity of removing the defective cable from the ground and with a minimum amount of excavation.

Figure 4:
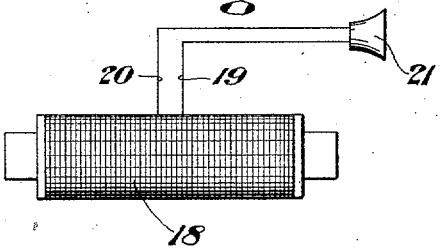
Figure 4 is a plan of an exploring coil and receiver used in detecting breaks and faults in armored cables.
Figure 3:
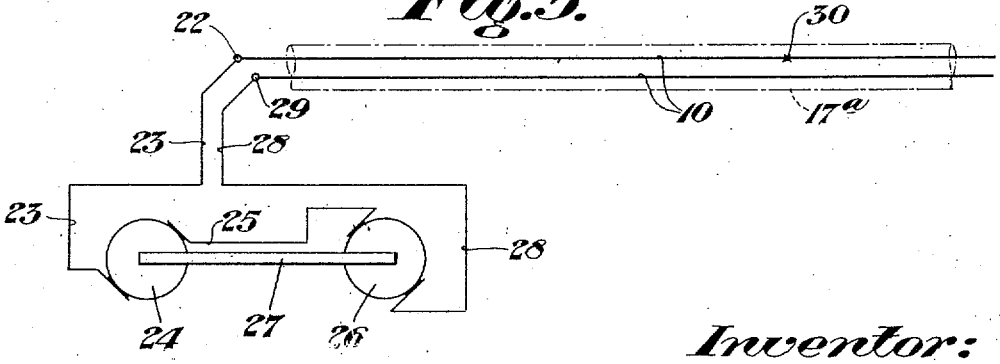
Figure 3 is a diagrammatic plan, hereinafter described.

In determining the location of a fault or break in a cable, a detector such as is shown in Figures 3 and 4 will be employed, this detector comprising an exploring coil 18 connected by wires 19 and 20 to a telephone receiver 21. (See Figure 4.)

In localizing a fault or break in a cable embodying my invention, a point 22 on one conductor 10 will be connected to one end of a connection 23, and an adjacent point 29 in a second conductor 10 will be connected to a connection 28. The connection 23 is attached by one end to a source of intermittent current 24, this source also being attached to one end of a connection 25. The other end of the connection 25 is attached to a commutator or make and break switch 26, the current source 24 and make and break switch 26 being mounted on a suitable connecting shaft or rod 27. The make and break switch 26 is secured to one end of the connection 28 which has its other end connected at the point 29 to one of the cable conductors 10, as has been described.

From the foregoing it will be readily seen that an intermittent current is supplied which passes along the conductors 10 of the cable, and which may be detected by means of the portable exploring coil 18 and receiver 21. In using this detector the operator carries the coil 18 and receiver 21 along the path of the cable, which may be submerged or may be buried in a trench, and which, due to its metallic non-magnetic armor, allows the magnetic lines of force to be concentrated in the core of the electrically permeable coil 18.

The coil 18, being permeable, causes a buzz in the telephone receiver 21 which will continue to sound until the fault (indicated at 30, Figure 3) is reached. When such fault is reached an interruption in the magnetic lines of force is caused thereby and buzzing in the receiver stops, and thereby indicates to the operator the location of the fault. The result is not possible with an armor of magnetic material, as the magnetic armor is electrically permeable, which causes the magnetic lines of force to be contained within said magnetic armor and renders the coil 18 and receiver 21 inoperative localizing faults or breaks in the cable.

It will be seen that my improved cable construction provides a metallic armored cable, in which a blow or compression applied to and penetrating the outer layer of armor will be cushioned before reaching an inner layer and thus reduce the likelihood of it penetrating the inner layer of armor. It will also be seen that my improved cable provides a construction wherein faults may be quickly localized at a minimum expense and without the necessity of removing any part of the cable for examination, all of which will be readily understood and appreciated by those skilled in the art.

Various changes and modifications in the construction and arrangement of the parts of the cables made according to my invention, may be made without departing from the spirit and scope thereof, as defined in the appended claims.

I claim—

1. A flexible armored cable comprising at least one conductor, a lead sheath mounted around and enclosing said conductor, a fibrous covering for said sheath, a non-magnetic metallic armor surrounding said fibrous covering, said armor comprising inner and outer helically wound zinc strips, and a continuous layer of jute between said inner and outer zinc strips adapted to relieve and cushion a blow or compression on the inner strip when such blow or compression is exerted on the outer strip, said outer zinc strip being staggered with respect to said inner zinc strip so as to overlap the helical joint formed by the abutting edges of said inner strip, and a water-proof covering enclosing said armor.

2. A flexible armored cable comprising at least one conductor, a lead sheath mounted around and enclosing said conductor, a fibrous covering for said sheath, a metallic armor surrounding said fibrous covering, said armor comprising inner and outer helically wound zinc strips, and a continuous layer of jute between said inner and outer strips adapted to relieve and cushion a blow or compression on the inner strip when such blow or compression is exerted on the outer strip, and said outer strip being staggered with respect to said inner strip so as to overlap the helical joint formed by the abutting edges of said inner strip.

In witness whereof I have hereunto signed my name.

ALEXANDER O. HOEFTMANN.